(12) United States Patent
Van Alsenoy et al.

(10) Patent No.: US 11,964,670 B1
(45) Date of Patent: Apr. 23, 2024

(54) METHODS AND APPARATUS FOR ESTIMATING ASSURANCE

(71) Applicant: Nuro, Inc., Mountain View, CA (US)

(72) Inventors: Thomas Van Alsenoy, San Francisco, CA (US); Sachin Patil, Burlingame, CA (US); Brian Neil, San Francisco, CA (US); Randol Aikin, Napa, CA (US); Peter Melick, San Francisco, CA (US); Yiming Huang, Mountain View, CA (US)

(73) Assignee: Nuro, Inc., Mountain View, CA (US)

( * ) Notice: Subject to any disclaimer, the term of this patent is extended or adjusted under 35 U.S.C. 154(b) by 296 days.

(21) Appl. No.: 17/695,418

(22) Filed: Mar. 15, 2022

Related U.S. Application Data

(60) Provisional application No. 63/161,791, filed on Mar. 16, 2021.

(51) Int. Cl.
*B60W 60/00* (2020.01)
*G01C 21/00* (2006.01)
*G01M 17/007* (2006.01)
*G06V 20/56* (2022.01)

(52) U.S. Cl.
CPC ..... *B60W 60/0011* (2020.02); *G01C 21/3837* (2020.08); *G01M 17/007* (2013.01); *G06V 20/588* (2022.01)

(58) Field of Classification Search
CPC ........... B60W 60/0011; G01C 21/3837; G06V 20/388; G01M 17/007
See application file for complete search history.

(56) References Cited

U.S. PATENT DOCUMENTS

| 11,238,674 B2 | 2/2022 | Amelunxen et al. |
| 2018/0060467 A1 | 3/2018 | Schulte et al. |

*Primary Examiner* — Peter D Nolan
*Assistant Examiner* — Mikko Okechukwu Obioha

(57) ABSTRACT

Safety metrics and/or statistical system assurance of a particular package of autonomy driving software may be substantially measured using data collected from manually driving a vehicle in the real word, simulations of scenarios which may be faced by a vehicle in the real world, simulations executed with actual software and/or hardware on a vehicle, and/or end-to-end testing of a vehicle in a test environment. Safety metrics and performance of AV software and hardware may be further evaluated through vehicle-in-the-loop testing. During each test scenario, a corresponding set of simulated perception data may be injected to the systems of the autonomous vehicle to cause the autonomous vehicle to react and behave as if one or more simulated objects described by the set of simulated perception data were in the environment of the autonomous vehicle. Each test scenario may be triggered to be performed based on, for example, the autonomous vehicle's location within a real-world vehicle testing space.

20 Claims, 13 Drawing Sheets

METHODS AND APPARATUS FOR ESTIMATING ASSURANCE

CROSS-REFERENCE TO RELATED APPLICATIONS

This application claims the benefit of Provisional U.S. Application Ser. No. 63/161,791, filed Mar. 16, 2021, titled "METHODS AND APPARATUS FOR ESTIMATING ASSURANCE"; the aforementioned priority application being hereby incorporated by reference in its entirety.

TECHNICAL FIELD

The disclosure relates to autonomous vehicles. More particularly, the disclosure relates to efficiently estimating a level of assurance for software used to enable vehicles to drive autonomously.

BACKGROUND

The use of autonomous vehicles, e.g., autonomous trucks and autonomous delivery vehicles, is growing. As such, the ability to ensure that autonomous vehicles may operate safely is becoming more important. Ensuring that software which is part of an autonomy system of a vehicle is able to safely control the vehicle as the vehicle drives is critical. Software which is part of an autonomy system of a vehicle is often tested on vehicles operating in the real world. Such a testing method may be impractical, as it may be difficult to achieve a desired number of road test miles.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
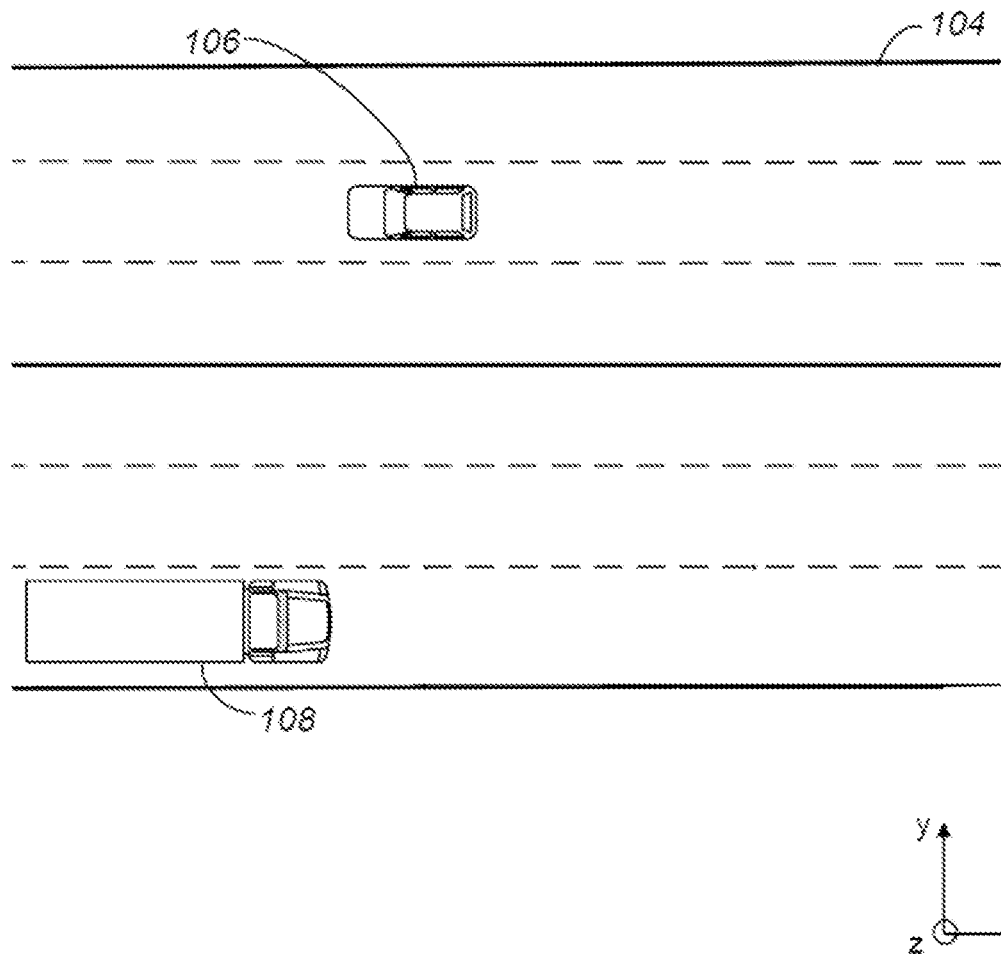
FIG. 1 is a diagrammatic representation of autonomous vehicles on a road in accordance with an embodiment.

In one embodiment, safety metrics and/or statistical system assurance of a particular package of autonomy driving software may be substantially measured using data collected from manually driving a vehicle in the real word, simulations of scenarios which may be faced by a vehicle in the real world, simulations executed with actual software and/or hardware on a vehicle, and/or end-to-end testing of a vehicle in a test environment. Identifying situations in which constraints may potentially be violated, and determining when violations actually occur, enables assessments to be made as to rates at which safety constraints may be violated when the autonomy driving software is in use. When rates of violation meet a threshold rate, autonomy driving software may be considered to meet an assurance level necessary to enable the autonomy driving software to be deployed on a vehicle.

In another embodiment, a vehicle test may be performed by generating sensor data by a set of sensors of an autonomous vehicle and causing one or more aspects of a perception system of the autonomous vehicle to be disabled such that the perception system ceases to generate real-world perception data based on the sensor data. Furthermore, while the one or more aspects of the perception system are disabled, the location of the autonomous vehicle within a real-world vehicle testing space may be determined based on the sensor data and autonomously navigating the autonomous vehicle through the real-world vehicle testing space. And, in response to determining that a first set of trigger conditions associated with a first test scenario is satisfied, a first set of simulated perception data associated with the first test scenario may be caused to be processed by the autonomous vehicle. The performance of the autonomous vehicle in response to the processing of the first set of simulated perception data may be evaluated.

Description

To safely deploy autonomous vehicles, systems of the autonomous vehicles, e.g., software systems such as autonomy systems, may effectively be repeatedly tested and validated. Estimating system reliability and/or uncovering potential software bugs thorough extensive real-world testing is often both costly and dangerous. Vehicle fleets such as fleets of trucks are typically supported by an extensive fleet management network, and seemingly minor changes to systems may have unexpected consequences that may lead to traffic-related incidents.

By estimating overall system reliability and/or assurance using simulation and offline testing tools, the ability to safely deploy autonomous vehicles is enhanced and generally does not pose a significant risk to the public. In one embodiment, a level of assurance of a given software release may be estimated by substantially measuring a likelihood of failure in an automated fashion that does not rely heavily on extensive real-world testing.

Statistical system assurance and/or safety metrics may be substantially measured using one ore more test methods. For example, test methods may include, but are not limited to including, the use of logs of data recorded while a vehicle is driven manually in the real-world, synthetic simulations, hardware-in loop simulations, and/or end-to-end testing of a vehicle on a test track or course. A test method may identify when a potential constraint violation is likely to occur, identify when the potential constraint violation is violated, and/or assess how frequently actual violations may occur.

A set of modules, e.g., software modules, may be arranged to effectively detect when there is the possibility for a constraint violation to occur. Constraints may generally define the nominal, or standard, behavior of a vehicle. A system operating on a vehicle may be deemed to be safe if substantially all constraints are met to a specified, or desired, level of assurance. Within a test set of information or data, opportunities for a constraint to be violated may be identified. Such opportunities may be considered to be occurrences. Detecting occurrences accurately is critical, as such detection may inform estimates of how often opportunities for violations or safety incidents may occur. By way of example, a likelihood of violating a buffer zone of a stationary vehicle may depends upon the frequency with which an autonomous vehicle encounters stationary vehicles in a particular driving environment. In one embodiment, occurrences may be generated by executing or otherwise running validation software on a log or on a synthetic simulation in a containerized pipeline that runs in the cloud. The validation software is configured to detect opportunities for constraint violations, and may generate data for each such occurrence. The new data may be stored as database entries or entries in a data storage arrangement, as will be discussed below.

An assessment may be made regarding of whether a requirement associated with a specific occurrence has been violated. For example, a simulated vehicle may pass too close to a stationary vehicle, thus directly creating a buffer zone violation. However, as the position of the stationary vehicle may be incorrectly estimated, it is possible that a buffer zone violation is not created.

Once occurrences have been assessed for violations, the frequency with which violations occur may be assessed. When substantially aggregated across effectively all occurrence types, an overall estimate may be generated for the rate at which the safety constraint may be violated.

Autonomous vehicles for which assurance may be automatically estimated may include, but are not limited to including, trucks and cars which may generally travel on land, as for example on roads. FIG. 1 is a diagrammatic representation of autonomous vehicles on a road in accordance with an embodiment. A road 104 may be shared by any number of vehicles including, but not limited to including, an autonomous car 106 and/or an autonomous truck 108. Autonomous car 106 and autonomous truck 108 may each include sensors and autonomy systems which may cooperate to support autonomous driving.

Figure 2A:
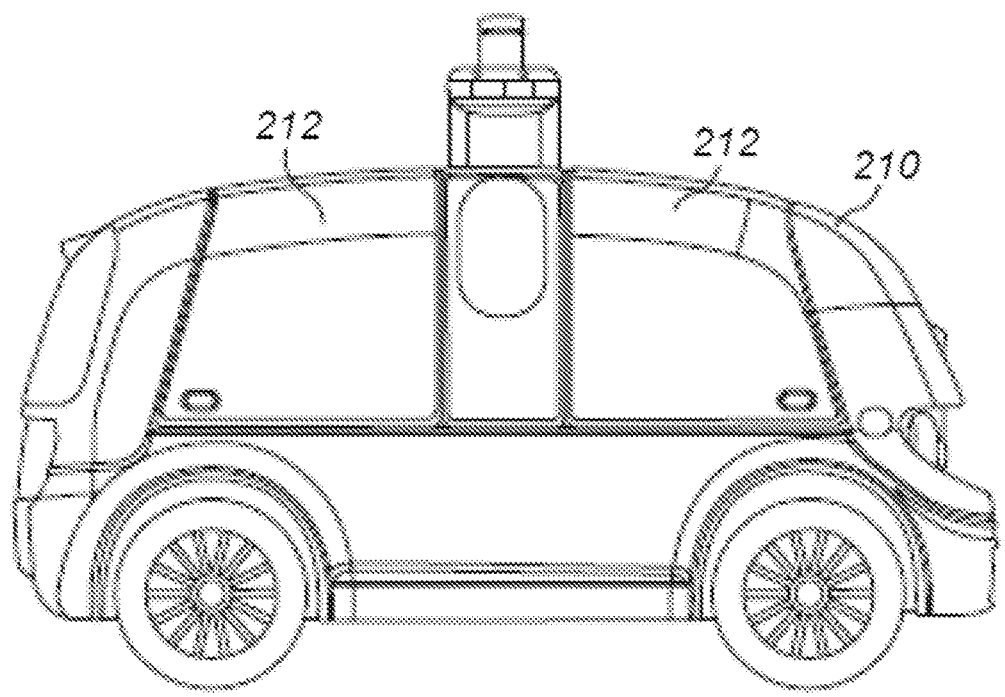
FIG. 2A is a diagrammatic side-view representation of an autonomous delivery vehicle in accordance with an embodiment.

Autonomous vehicles are not limited to autonomous cars and trucks. In one embodiment, an autonomous vehicle may be an autonomous delivery vehicle. FIG. 2A is a diagrammatic side-view representation of an autonomous delivery vehicle in accordance with an embodiment. An autonomous delivery vehicle 210, as shown, is a vehicle configured for land travel. Typically, autonomous delivery vehicle 210 includes physical vehicle components such as a body or a chassis, as well as conveyance mechanisms, e.g., wheels. In one embodiment, autonomous vehicle 210 may be relatively narrow, e.g., approximately two to approximately five feet wide, and may have a relatively low mass and relatively low center of gravity for stability. Autonomous delivery vehicle 210 may be arranged to have a working speed or velocity range of between approximately one and approximately forty-five miles per hour (mph), e.g., approximately twenty-five miles per hour. In some embodiments, autonomous delivery vehicle 210 may have a substantially maximum speed or velocity in range between approximately thirty and approximately ninety mph.

Figure 2B:
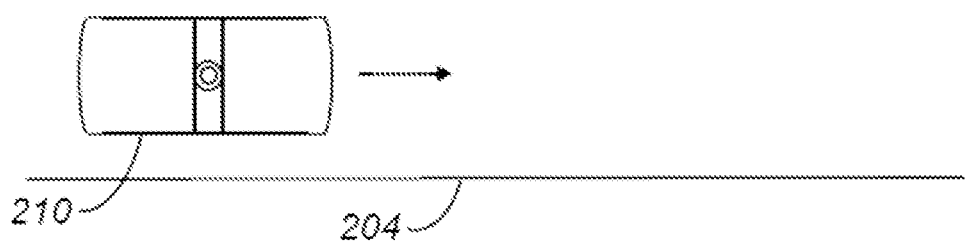
FIG. 2B is a block diagram representation of an autonomous delivery vehicle, e.g., vehicle 320 of FIG. 2A, on a road in accordance with an embodiment.
Figure 2B:
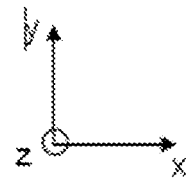

Autonomous delivery vehicle 210 includes a plurality of compartments 212. Compartments 212 may be assigned to one or more entities, such as one or more customer, retailers, and/or vendors. Compartments 212 are generally arranged to contain cargo, items, and/or goods. Typically, compartments 212 may be secure compartments. It should be appreciated that the number of compartments 212 may vary. That is, although two compartments 212 are shown, autonomous delivery vehicle 210 is not limited to including two compartments 212. As shown in FIG. 2B, autonomous vehicle 212 may drive on a road 204 when performing deliveries, e.g., when delivery cargo, items, and/or goods contained within compartments 212.

Figure 3:
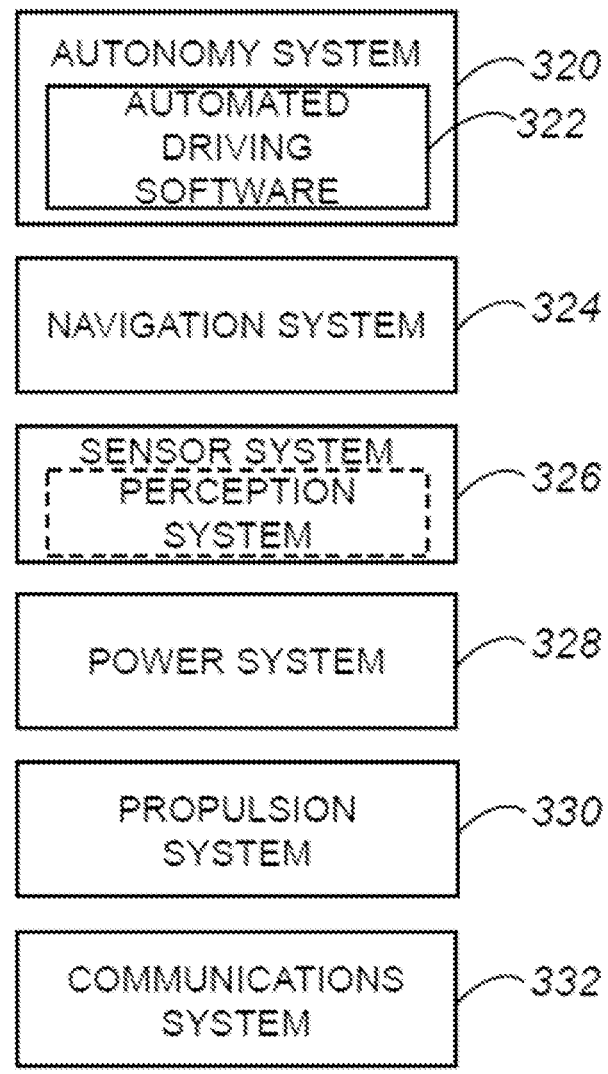
FIG. 3 is a block diagram representation of an autonomous vehicle in accordance with an embodiment.

Autonomous delivery vehicle 210 of FIGS. 2A and 2B, autonomous car 106 of FIG. 1, and autonomous truck 108 may generally include similar systems. FIG. 3 is a block diagram representation of a general autonomous vehicle in accordance with an embodiment. An autonomous vehicle 316 includes an autonomy system 320, a navigation system 324, a sensor system 326, a power system 328, a propulsion system 330, and a communications system 332.

Autonomy system 320 generally includes automated driving software 322 which enables autonomous vehicle 316 to drive fully autonomously or semi-autonomously. That is, when autonomous vehicle 316 is operating under the control of automated driving software 322, autonomous vehicle 316 is able to generally operate without a driver or a remote operator controlling autonomous vehicle. When autonomous vehicle 316 operates in a semi-autonomous mode, autonomous vehicle 316 may operate autonomously at times and may operate under the control of a driver or a remote operator at other times. When autonomous vehicle 316 operates in a fully autonomous mode, autonomous vehicle 316 typically operates substantially only under the control of automated driving software 322.

Navigation system 324 may cooperate with propulsion system 330 to navigate autonomous vehicle 316 through paths and/or within unstructured open or closed environments. Navigation system 324 may include at least one of digital maps, street view photographs, and a global positioning system (GPS) point. Maps, for example, may be utilized in cooperation with sensors included in sensor system 326 to allow navigation system 324 to cause autonomous vehicle 316 to navigate through an environment.

Sensor system 326 includes any sensors which facilitate the operation of autonomous vehicle 316. Sensors may include, for example, LiDAR, radar, ultrasonic sensors, microphones, altimeters, and/or cameras. Sensor system 326 generally includes onboard sensors which allow autonomous vehicle 326 to safely navigate, and to ascertain when there are objects near autonomous vehicle 326. Sensor system 326 may include propulsion systems sensors that monitor drive mechanism performance, drive train performance, and/or power system levels. In one embodiment, sensor system 326 may include sensors used as part of a perception system.

Power system 328 is arranged to provide power to autonomous vehicle 316. Power may be provided as electrical power, gas power, or any other suitable power, e.g., solar power or battery power. In one embodiment, power system 328 may include a main power source and an auxiliary power source that may serve to power various components of autonomous vehicle 316 and/or to generally provide power to autonomous vehicle 316 when the main power source does not have the capacity to provide sufficient power.

Propulsion system 330, or a conveyance system, is arranged to cause autonomous vehicle 316 to move, e.g., drive or travel. For example, when autonomous vehicle 316 is configured with a multi-wheeled automotive configuration as well as steering, braking systems and an engine, propulsion system 330 may be arranged to cause the engine, wheels, steering, and braking systems to cooperate to drive. In general, propulsion system 330 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Communications system 332 allows autonomous vehicle 316 to communicate, as for example, wirelessly, with a fleet management system (not shown) that allows autonomous vehicle 316 to be controlled remotely, e.g., when autonomous vehicle 316 is not operating autonomously. Communications system 332 generally obtains or receives data, stores the data, and transmits or provides the data to a fleet management system and/or to other autonomous vehicles within a fleet of autonomous vehicles. The data may include, but is not limited to including, information relating to scheduled requests or orders, information relating to on-demand requests or orders, and/or information relating to a need for autonomous vehicle 332 to reposition itself, e.g., in response to an anticipated demand.

Figure 4:
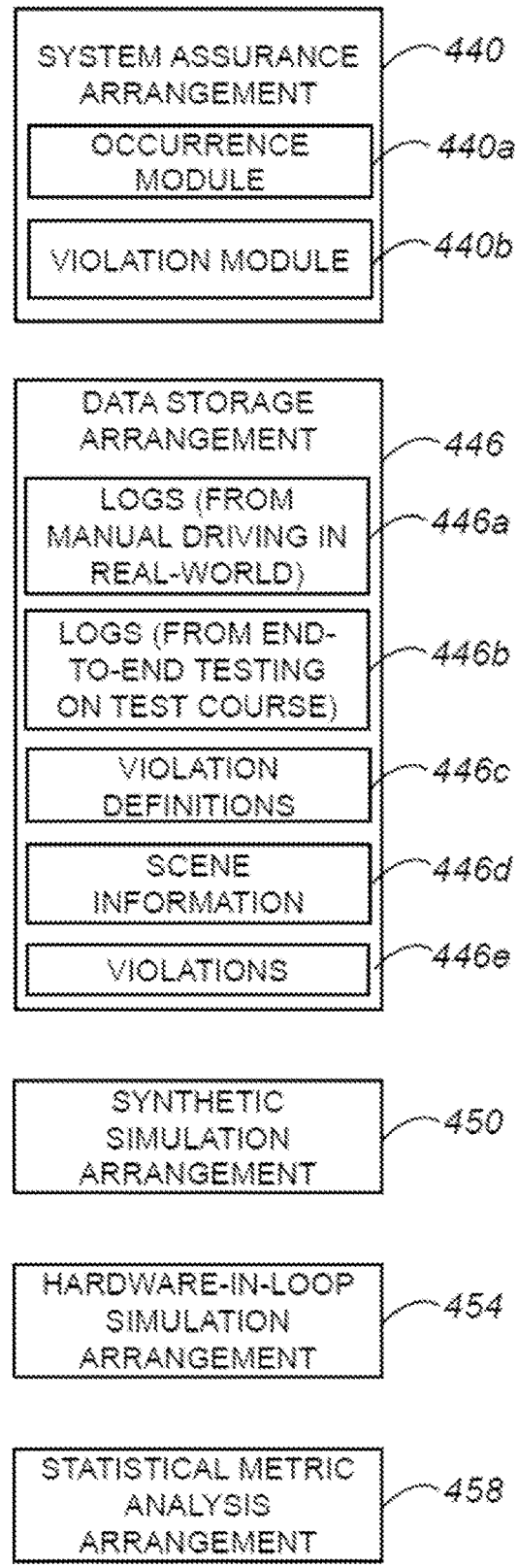
FIG. 4 is a block diagram representation of an overall validation testing system or platform in accordance with an embodiment.

In one embodiment, a validation testing system, e.g., a system that is associated with validation software, may be used to substantially measure system assurance for automated driving software such as automated driving system 322 before automated driving system 322 is used on vehicle 316. Referring next to FIG. 4, an overall validation testing system or platform in accordance with an embodiment. A validation testing system or platform 438 generally includes a system assurance arrangement 440, a data storage arrangement 446, a synthetic simulation arrangement 450, a hardware-in-loop simulation arrangement 454, and a statistical metric analysis arrangement 458. It should be appreciated that validation testing system 438 may generally be a distributed system. By way of example, system assurance arrangement 440 and data storage arrangement 446 may be located on a server at one location, while hardware-in-loop simulation arrangement 454 may be located on a vehicle at a different location.

System assurance arrangement 440 includes an occurrence module 440a and a violation module 440b. Occurrence module 440a is configured to obtain constraints which effectively define a nominal behavior of a vehicle and to ascertain when opportunities may exist for constraints to be violated. Using information such as logs of data recorded when a vehicle is driven manually and/or data from synthetic simulations, occurrence module 440a may effectively detect occurrences or opportunities for constraints to be violated. In one embodiment, occurrence module 440a includes occurrence generation software configured to detect when a violation may occur. Violation module 440b may determine from logs or other data when there are actual violations associated with occurrences. In one embodiment, violation module 440b includes violation generation software configured to assess whether an occurrence violated any constraints or requirements. Generally, system assurance arrangement 440 is configured to determine that a system is safe if substantially all constraints are met to a specified level of assurance.

Data storage arrangement 446 is configured to store data which may be provided as input to system assurance arrangement 440, otherwise used by system assurance arrangement 440, and/or obtained as output from system assurance arrangement 440. Data storage arrangement 446 may include a database such as a relational database.

Data stored in data storage arrangement 446 may include, but is not limited to including, logs of data obtained from manual driving in the real-world 446a, logs of data obtained from end-to-end testing on a test course 446b, definitions of violations 446c, and scene information 446d. Logs 446a may include data recorded or otherwise collected while a vehicle is driven manually on real roads and in real situations. Logs 446b may include data recorded or collected when a vehicle is tested, e.g., when an automated driving system is tested, in a controlled environment such as a test track. In one embodiment, logs 446a, 446b may essentially form an occurrence database which stores data relating to simulations, assessments, and potential violations. Definitions of violations 446c may effectively be a requirement database which includes definitions of what are considered to be violations, and may include occurrences and violations extracted from data and/or identified by system assurance arrangement 440. Occurrences may include buffer zone violations, as will be discussed below with reference to FIGS. 8A and 8B. Scene information 446d generally includes a suite of test instances against which system assurance arrangement 440 may be executed. Scenes contained in scene information 446d may be a varying durations that are chosen based on factors such as an ability for cloud processing to be relatively highly parallelized.

In one embodiment, violations 446e may be stored in data storage arrangement 446. That is, violation instances identified by violation module 440b may be stored for subsequent processing. Violations may be identified as relatively complex, or as relatively simple. It should be appreciated that violations may be subsequently assessed at least in part through a comparison with occurrences.

Synthetic simulation arrangement 450 may be configured to simulate scenarios that include synthetic representations of obstacles such as vehicles and/or pedestrians, driving environments, etc. Occurrences may be detected from outputs of synthetic simulation arrangement 450. While information or output may be provided directly from synthetic simulation arrangement 450 to system assurance arrangement 440, it should be appreciated that such information or output may instead be provided to data storage arrangement 446.

Hardware-in-loop simulation arrangement 454 is configured to enable simulations to be executed using hardware on a vehicle, e.g., actual hardware on a truck or a delivery vehicle. Information or output obtained from hardware-in-loop simulation arrangement 454 may be provided substantially directly to system assurance arrangement 440, or provided to data storage arrangement 446.

Statistical metric analysis arrangement 458 is arranged to enable an overall system performance to be determined for automated driving software that is assessed using validation testing system or platform 438. Statistical metric analysis arrangement 458 may calculate a parameter that may be used to assess overall system performance. Such a parameter, or metric, may vary widely. For example, a statistical metric may be defined to specify that at least ninety-nine percent of journeys or trips of less than one thousand miles may be completed without any substantial risk of a safety incident caused by automated driving software. Validation testing system or platform 438 may generally automatically calculate a desired statistical metric.

Figure 5:
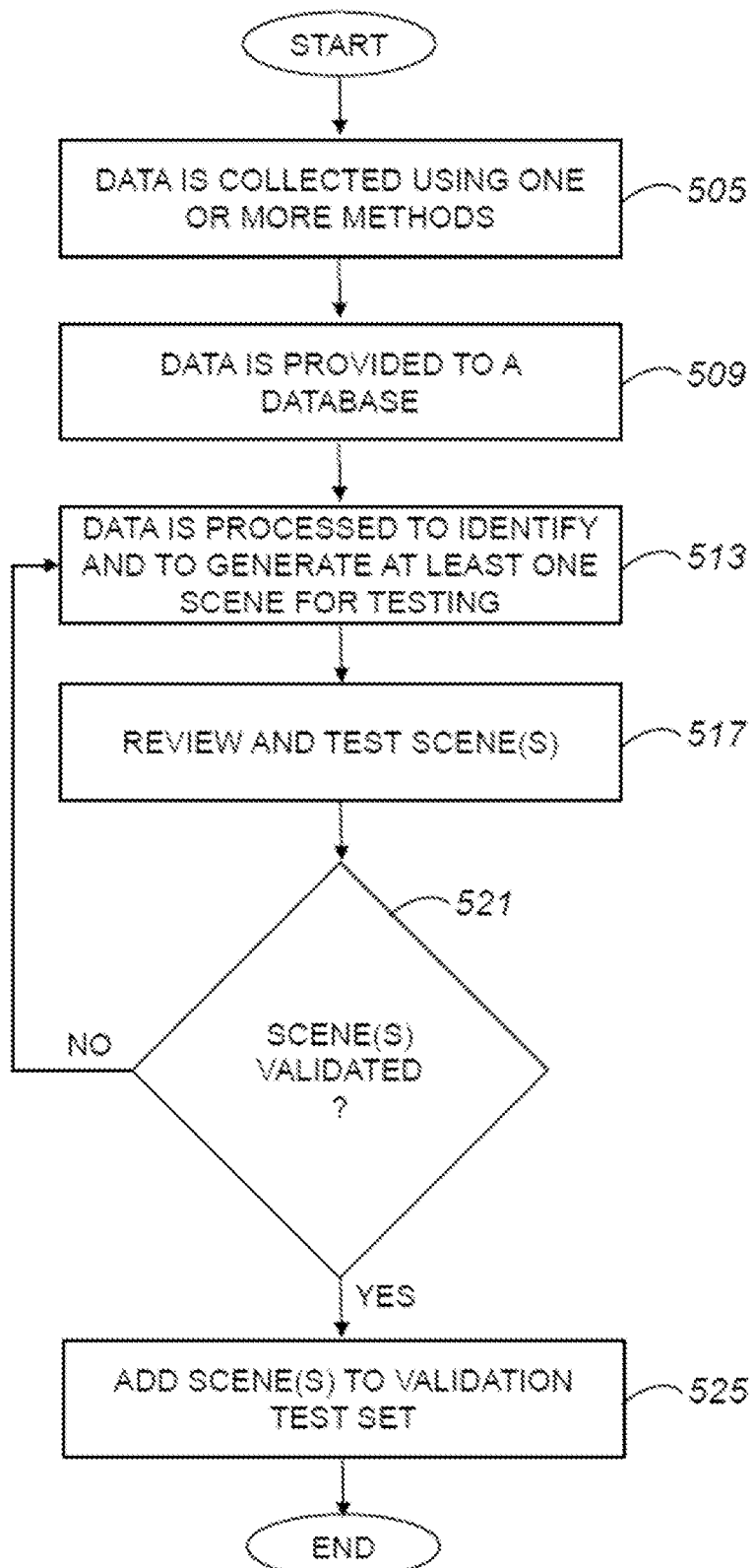
FIG. 5 is a process flow diagram which illustrates a method of generating a set of test data which may be used by an overall validation testing system in accordance with an embodiment.

FIG. 5 is a process flow diagram which illustrates a method of generating a set of test data which may be used by an overall validation testing system such as validation testing system 438 of FIG. 4 in accordance with an embodiment. A method 501 of generating a set of data which may be used by a validation testing system begins at a step 505 in which data is collected using one or more methods. Data may be collected through methods including, but not limited to including, synthetic simulations, real-world driving, hardware-in-loop simulations, and/or testing on test tracks.

Once data is collected, data may be provided to a database in a step 509. In a step 513, the data is processed to identify and to generate at least one scene for testing. That is, data may be parsed to identify at least one occurrence for which a violation may occur.

After at least one test scene is generated for testing, the test scene is reviewed and tested in a step 517. Reviewing and testing may include ascertaining whether the test scene indeed indicates an occurrence for which a violation may occur. A determination is made in a step 521 as to whether the scene has been validated, e.g., whether the scene indicates an occurrence to be tested.

If the determination in step 521 is that the scene is not validated, process flow returns to step 513 in which data is once again processed to identify and to generate at least one scene for testing. Alternatively, if it is determined in step 521 that the scene is validated, the scene is added to a validation test set in a step 525, and the method of generating a set of data which may be used by a validation testing system is completed.

Figure 6:
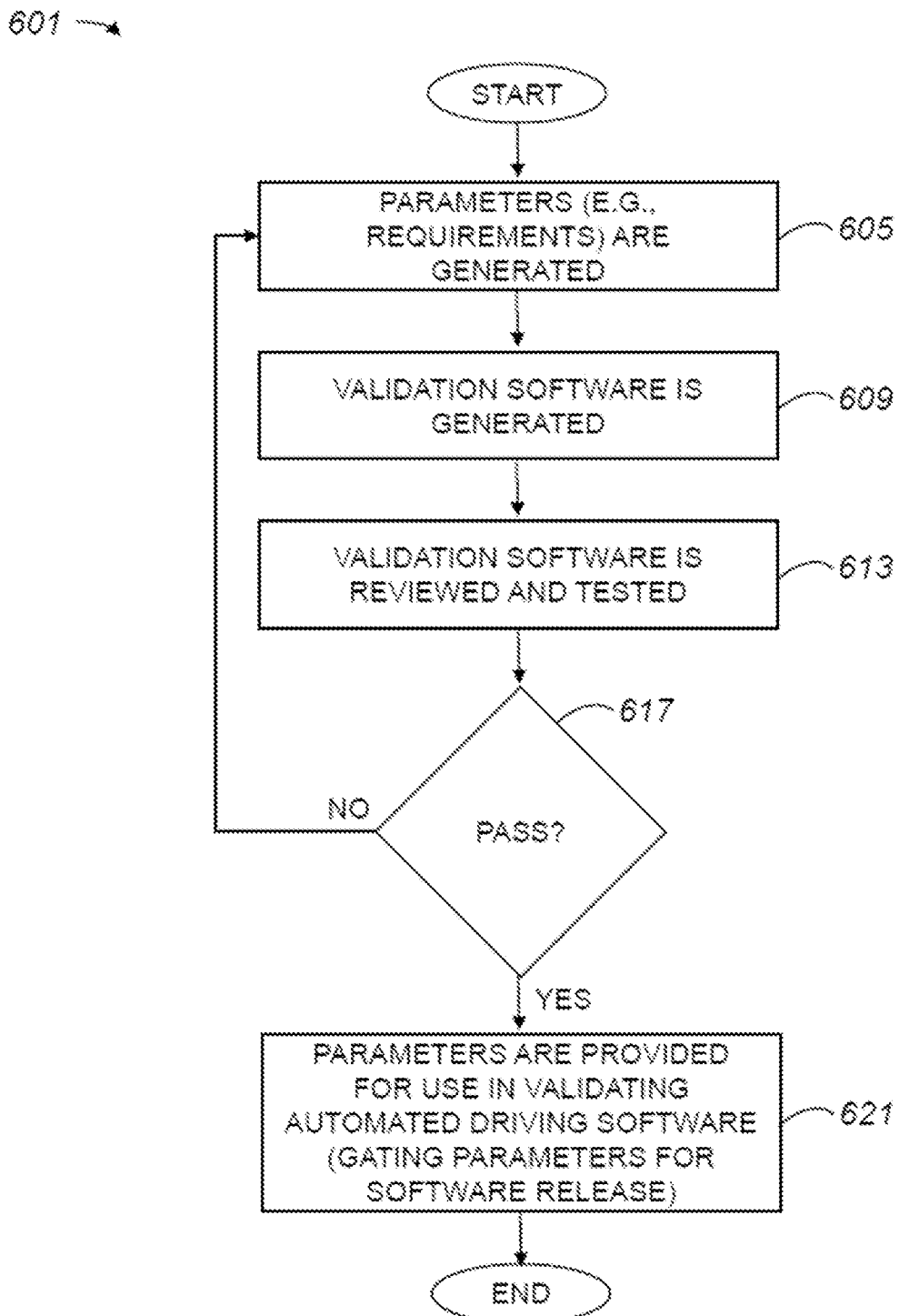
FIG. 6 is a process flow diagram which illustrates a method of generating gating parameters for use in validating proposed autonomy driving software in accordance with an embodiment.

FIG. 6 is a process flow diagram which illustrates a method of generating gating parameters for use in validating proposed autonomy or automated driving software in accordance with an embodiment. A method 601 of generating gating parameters begins at a step 605 in which parameters, e.g., requirements, are generated. In one embodiment, the parameters include definitions of what may be considered to be a violation.

Validation software is generated or otherwise obtained in a step 609. Validation software is generally configured to substantially fully test automated driving software to ascertain whether the automated driving software meets a standard of system performance. The validation software is reviewed and tested in a step 613.

A determination is made in a step 617 regarding whether the validation software passes review and testing. If it is determined that the validation software does not pass review and testing, process flow returns to step 605 in which parameters may be regenerated. Alternatively, if it is determined in step 617 that the validation software passes review and testing, then in a step 621, the parameters are provided for use in validating automated driving software. The parameters may be provided as gating parameters to be used in the validation of automated driving software. After the parameters are provided for use in validating automated driving software, the method of generating gating parameters is completed.

Figure 7:
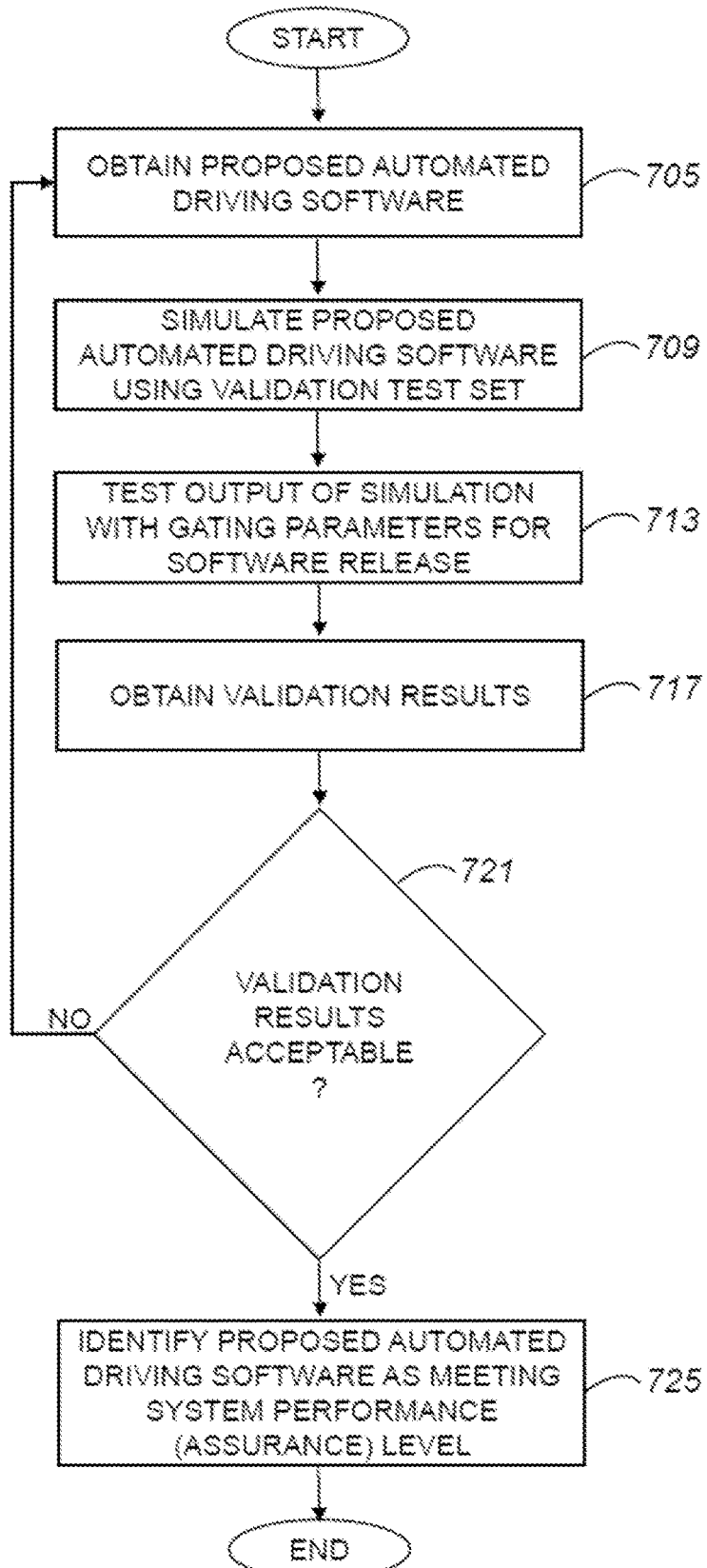
FIG. 7 is a process flow diagram which illustrates a method of evaluating proposed autonomy driving software in accordance with an embodiment.

FIG. 7 is a process flow diagram which illustrates a method of evaluating proposed autonomy driving software in accordance with an embodiment. A method 701 or evaluating proposed autonomy driving software begins at a step 705 in which proposed automated driving software is obtained. The proposed automated driving software may be a new release of automated driving software, and/or may be an updated version of previously validated automated driving software.

Once the proposed automated driving software is obtained, the proposed automated driving software is simulated using a validation test set in a step 709. The output of the simulation is tested with gating parameters for the software release in a step 713, and results of the testing are obtained as validation results in a step 717.

It is determined in a step 721 if the validation results are acceptable. Such a determination may include determining whether the validation results meet system metrics which indicate that a level of assurance meets standards. If the determination is that the validation results are not acceptable, then process flow returns to step 705 in which proposed automated driving software is obtained. It should be appreciated that obtaining proposed automated driving software may include updating the proposed automated driving software.

Alternatively, if the validation results are determined to be acceptable, the implication is that the proposed autonomy driving software meets assurance requirements. Accordingly, in a step 725, the proposed automated driving software is identified as meeting a system performance or assurance level, and the method of evaluating proposed autonomy driving software is completed.

Figure 8A:
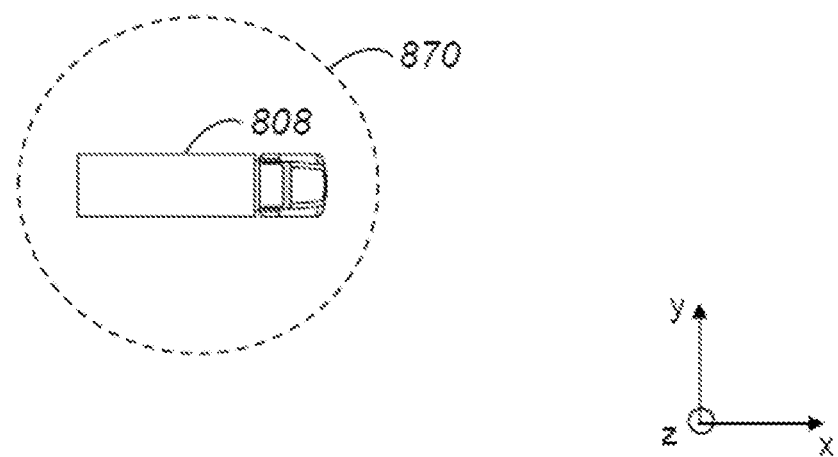
FIG. 8A is a diagrammatic representation of a vehicle with a buffer zone in accordance with an embodiment.

As mentioned above, a statistical measure which may effectively measure overall system performance of automated driving software may vary widely. In calculating a selected statistical measure, rates at which a fleet of autonomous vehicles operating the autonomy driving software may venture too close to other road users may be calculated. When an autonomous vehicle ventures too close to another road user, e.g., another vehicle or a pedestrian, a buffer zone violation may occur. A validation testing system such as system 438 of FIG. 4 may estimate the likelihood of buffer zone violations occurring. FIG. 8A is a diagrammatic representation of a vehicle with a buffer zone in accordance with an embodiment. A vehicle 808, which may be an autonomous truck on which automated driving software is operating, has a buffer zone 870 defined therearound. Buffer zone 870 generally encompasses an area around vehicle 808 relative to at least an x-axis and a y-axis. The size and shape of buffer zone 870 may vary widely depending upon factors which may include, but are not limited to including, the speed at which vehicle 808 is travelling, the type of road on which vehicle 808 is travelling, road conditions, etc.

Figure 8B:
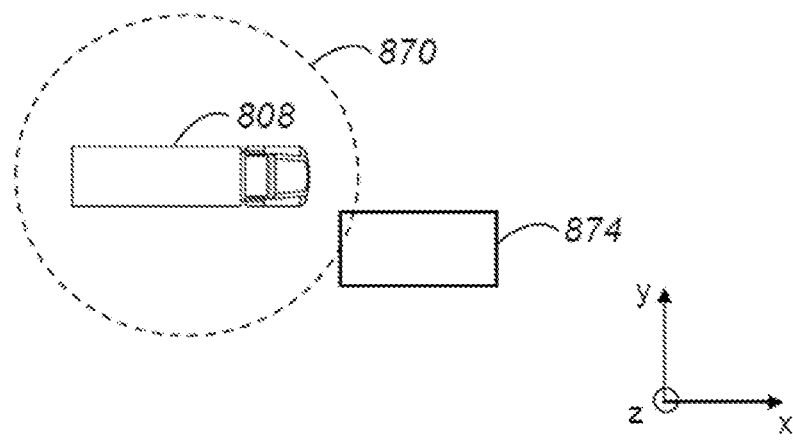
FIG. 8B is a diagrammatic representation of a vehicle with a buffer zone, e.g., vehicle 808 and buffer zone 870 of FIG. 8A, in which at least a part of an object appears in accordance with an embodiment.

A buffer zone violation may occur when an object such as another road user passes is detected at least partially within buffer zone 870. As shown in FIG. 8B, an object 874 that is partially within buffer zone 870 may be identified as causing a buffer zone violation with respect to vehicle 808.

According to embodiments, system reliability and/or assurance may be further estimated or determined through testing of autonomous vehicles using vehicle-in-the-loop evaluations. As described herein, a vehicle-in-the-loop evaluation may evaluate the performance and/or behavior of the autonomous vehicle in the real world (e.g., physically on a test track) in response to simulated perception data that describe virtual objects. A vehicle-in-the-loop evaluation may comprise a plurality of test scenarios (e.g., a gauntlet of vehicle tests). During each test scenario, a corresponding set of simulated perception data may be injected to the systems of the autonomous vehicle to cause the autonomous vehicle to react and behave as if one or more simulated objects described by the set of simulated perception data were in the environment of the autonomous vehicle. Each test scenario may be triggered to be performed based on, for example, the autonomous vehicle's location within a real-world vehicle testing space.

Figure 9:
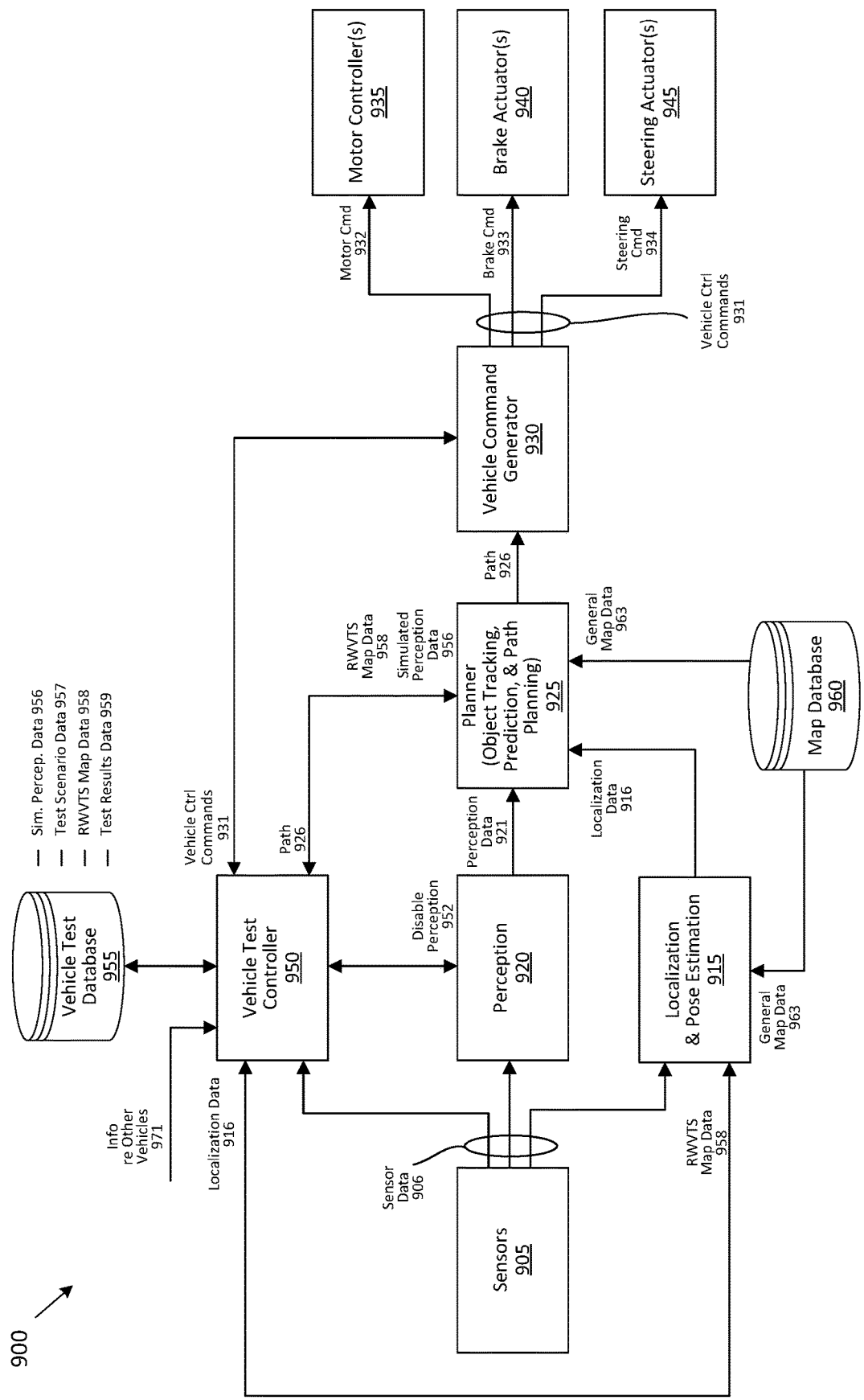
FIG. 9 is a block diagram illustrating an example autonomous vehicle which may be tested using simulated perception data, in accordance with embodiments.

FIG. 9 is a block diagram illustrating an example autonomous vehicle which may be tested using simulated perception data, in accordance with embodiments. The autonomous vehicle depicted in FIG. 9A may be an autonomous truck, an autonomous passenger vehicle, or an autonomous delivery vehicle (e.g., an occupant-less autonomous delivery vehicle) such as the example illustrated in FIG. 2A.

The autonomous vehicle 900 may include a set of sensors 905, a localization and pose estimation module 915, a perception module 920, a planner module 925, a vehicle command generator 930, a motor controller(s) 935, a brake actuator(s) 940, and a steering actuator(s) 945. The set of sensors 905 onboard the autonomous vehicle may include one or more cameras, LiDARs, radars, thermal imaging sensors, ultrasonic sensors, location sensors (e.g., GPS, Galileo, GLONASS, etc.), inertial sensors, and the like. The sensors 905 may generate sensor data 906 which may be provided to the localization and pose estimation module 915 and the perception module 920. The sensor data 906 may include images or video streams captured by the cameras, LiDAR data, radar data, and the like.

The localization and pose estimation module 915 may generate, based on the received sensor data 906, localization data 916. In one aspect, the localization and pose estimation module 915 may determine an absolute position (e.g., in terms of a coordinate system) of the autonomous vehicle 900 based on, for example, sensor data 906 such as GPS data obtained from GPS sensors. In addition, or as an alternative, the localization and pose estimation module 915 may further determine a relative position of the autonomous vehicle 900 based on sensor data 905 such as data from the cameras, LiDARs, radars, and inertial sensors. The relative position of the autonomous vehicle may indicate the position of the autonomous vehicle 900 relative to lane markers, road boundaries, environment features, and landmarks. The localization data 916 may indicate the absolute position of the autonomous vehicle 900, the relative position of the autonomous vehicle, or both. The localization data 916 may be processed by the planner 925. For instance, the relative position of the autonomous vehicle 900 (e.g., position of the autonomous vehicle 900 relative to lane markers and road boundaries etc.) may be used by the planner 925 to generate a path 926 that keeps the autonomous vehicle 900 within its lane and on the road. In another aspect, during normal operations of the autonomous vehicle 900 (e.g., during times other than vehicle testing within a real-world vehicle testing space), the localization and pose estimation module 915 may use map data, such as general map data 963 from a map database to generate the localization data 916. The general map data 963 may describe a geographic region in which the autonomous vehicle 900 operates. The general map data may include information relating to traversable roads, speed limits, geographic or environmental features, or landmarks in the geographic region, etc. In some examples, the localization and pose estimation 915 may determine a location of the autonomous vehicle 900 based on the environmental features or landmarks identified in the general map data 963.

The perception module 920 may analyze the sensor data 906 using one or more perception algorithms to generate perception data 921. According to embodiments, the perception data 921 may describe the environment of the autonomous vehicle 900 including any objects perceived or identified by the perception module 920. For a perceived object, the perception data 921 may describe one or more of: a classification of the object (e.g., a vehicle, a pedestrian, a cyclist, a motorcyclist, etc.), a position of the simulated object (e.g., relative position to the autonomous vehicle 900), a velocity and/or acceleration of the object, a trajectory or path of the object, an orientation or pose of the object, and the like. The perception data 921 may also generate a bounding shape (e.g., a three-dimensional bounding box) for the perceived object. The bounding shape may reflect the size of the object and its pose or orientation. During normal operations of the autonomous vehicle 900 (e.g., during times other than vehicle testing using simulated perception data), the perception data 921 may be passed to the planner 925 such that the path 926 of the vehicle may be generated based on the perception data 921.

The planner 925 receives the localization data 916 from the localization and pose estimation module 915 and the perception data 921 from the perception module 920 to generate a path 926 during autonomous operations of the autonomous vehicle 900. In one aspect, the planner 925 may perform functions such as object tracking and prediction based on the perception data 921 from the perception module 920. Furthermore, during normal operations of the autonomous vehicle 900 (e.g., during times other than vehicle testing within a real-world vehicle testing space), the path 926 may be generated using the general map data 968 from the map database 960.

The path 926 generated by the planner 925 may be received by the vehicle command generator 930, which may generate a set of vehicle control commands 931 to control components such as motor controllers 1025, brake actuators 1030, and steering actuators 1035 to control the autonomous vehicle 900 to follow the path 926. For example, the motor command 932 may cause the motor controller(s) 935 to increase or decrease the motor output(s) to affect the autonomous vehicle's acceleration. The brake command 933 may cause the brake actuators 940 to engage and decelerate the vehicle. And the steering command 945 may cause the steering actuators 945 to rotate the front wheels of the autonomous vehicle to modify the autonomous vehicle's direction or to rotate the vehicle (e.g., a yaw rotation).

During an evaluation of the autonomous vehicle 900 within a real-world vehicle testing space and using simulated perception data, a vehicle test controller 950 may be used. The vehicle test controller 950 may be a software component implemented on a computing system of the autonomous vehicle 900 (e.g., a main compute system of the autonomous vehicle 900 that implements one or more sets of autonomy functions of the autonomous vehicle 900). As an alternative, or in addition, the vehicle test controller 950 may be implemented on an external computer system that is co-located with the autonomous vehicle 900 such as a laptop computer on-board the autonomous vehicle 900 that is configured to communicate with various systems and components of the autonomous vehicle 900. As yet another alternative, or in addition, the vehicle test controller 950 may be a remote computing system (e.g., a computing system(s) set up at the test location or a cloud-based server system(s)) that is configured to communicate with the autonomous vehicle 900 via one or more wireless communication links (e.g., a 3G/4G/5G data link, etc.).

According to embodiments, the vehicle test controller 950 may control various aspects of the autonomous vehicle 900 and/or a vehicle test during testing of the autonomous vehicle 900. In one aspect, the vehicle test controller 950 may monitor the location and/or progress of the autonomous vehicle 900 as it progresses through a real-world vehicle testing space (RWVTS) to complete various test scenarios of the vehicle test. For instance, the vehicle test controller 950 may trigger a particular test scenario by loading or injecting simulated perception data 951 associated with the particular test scenario based on the autonomous vehicle 900's location within the real-world vehicle testing space. Furthermore, the vehicle test controller 950 may determine which of a plurality of test scenarios to implement based on various information including the autonomous vehicle's location within the real-world vehicle testing space. In another aspect, the vehicle test controller 950 may control aspects of the autonomous vehicle 900 during the vehicle test. For example, the vehicle test controller 950 may generate instructions or commands to cause the autonomous vehicle 900 to disable one or more aspects of the perception module 920 (e.g., to prevent the perception module 920 from generating perception data 921 using sensor data) during one or more test scenarios of the vehicle test. As another example, the vehicle test controller 950 may generate instructions or commands to control or modify the autonomous vehicle 900's progress through the real-world vehicle testing space (e.g., to modify the speed of the autonomous vehicle 900, to cause the autonomous vehicle 900 to stop or start, etc.).

In more detail, the vehicle test controller 950 may be communicatively coupled to a vehicle test database 955, which may store simulated perception data 956, test scenario data 957, real-world vehicle testing space (RWVTS) map data 958, and test results data 959. During a vehicle test, a plurality of test scenarios may be defined and information relating to the test scenarios may be stored as the test scenario data 957. The RWVTS map data 958 may be detailed map data that describes the RWVTS, which may be a loop or a track through which an autonomous vehicle under testing may repeatedly navigate during a vehicle test. According to embodiments, RWVTS map data 958 describe various features of the RWVTS such as road or other boundaries for the autonomous vehicle 900, lane markers, or other features or landmarks. According to embodiments, the localization and pose estimation module 915 of the autonomous vehicle 900 may determine a location of the autonomous vehicle 900 within the RWVTS using sensor data 906 and the RWVTS map data 958. For instance, a localization algorithm may be executed by the localization and pose estimation module 915 to utilize the sensor data 906 and the RWVTS map data 958, which defines boundaries and features of the RWVTS, to enable the localization and pose estimation module 915 to determine a precise current location of the autonomous vehicle 900 within the RWVTS. The autonomous vehicle 900 may be further enabled to autonomously navigate the RWVTS using the localization data 916 and the RWVTS map data 958.

According to embodiments, a plurality of test scenarios may be performed as the vehicle traverses the RWVTS. In addition, each of the plurality of test scenarios may be associated with a set of simulated perception data 956. The set of simulated perception data 956 associated with a particular test scenario may describe or indicate one or more virtual object(s) to be simulated in the vehicle's perceived environment during the test scenario. A virtual object is not one that is physically present in the real-world environment of the autonomous vehicle 900, but nevertheless perceived by the autonomous vehicle during the test scenario for purposes of performing the vehicle test. By processing the simulated perception data 956, the autonomous vehicle 900 would behave as if the virtual object(s) simulated by the simulated perception data 956 were actually in the physical environment of the autonomous vehicle 900. In other words, rather than describing real objects in the real-world environment of the autonomous vehicle, the simulated perception data describes virtual objects to which the autonomous vehicle 900 under testing would react as if the virtual objects were real objects. For instance, a virtual pedestrian crossing the road may be simulated using the simulated perception data 956 to test the autonomous vehicle 900's performance in reacting to the presence of the virtual pedestrian. The simulated perception data may describe one or more of: a classification of the simulated object being described by the simulated perception data (e.g., a vehicle, a pedestrian, a cyclist, a motorcyclist, etc.), a position of the simulated object (e.g., relative position to the autonomous vehicle under testing and/or position within the real-world testing space), a velocity and/or acceleration of the simulated object, a trajectory or path of the simulated object, an orientation or pose of the simulated object, a three-dimensional bounding shape (e.g., a bounding box) associated with the simulated object, etc.

According to embodiments, the vehicle test controller 950 may monitor the autonomous vehicle 900's location within the RWVTS (e.g., based on the localization data 916) as the autonomous vehicle 900 progresses through the RWVTS. In one aspect, the vehicle test controller 950 may determine which of a plurality of test scenarios to execute based on the autonomous vehicle 900's current physical location within the RWVTS. Different vehicle test scenarios may have different requirements regarding physical testing space and may be appropriate at different portions of the RWVTS. Thus, the vehicle test controller 950 may select or identify a particular test scenario to be performed by the autonomous vehicle 900 based on the location of the autonomous vehicle 900 within the RWVTS. In this manner, the appropriate set of simulated perception data 956 may be loaded or injected to simulate virtual objects to be used for the particular test scenario. In another aspect, the vehicle test controller 950 may trigger the performance of a test scenario (e.g., by loading or injecting of the appropriate set of simulated perception data) based on the autonomous vehicle 900 reaching a particular location within the RWVTS.

The vehicle test controller 950 may further monitor and/or evaluate vehicle performance and behavior by receiving, for example, sensor data 906, the vehicle path 926, and the vehicle control commands 931. In one aspect, the vehicle test controller 950 may monitor aspects of the operating conditions of the autonomous vehicle 900 to trigger the performance of a test scenario (e.g., by loading or injecting of the appropriate set of simulated perception data). In an example, a set of simulated perception data may be triggered to be injected to the systems of the autonomous vehicle (e.g., loaded to the planner 925) in response to the autonomous vehicle 900 reaching a prescribed speed associated with the test scenario.

In another aspect, the vehicle test controller 950 may monitor vehicle behavior and/or performance during a test scenario and may store the performance data (or data containing evaluations thereof) as test results data 959. For instance, the vehicle test controller 950 may monitor inertial sensors (e.g., accelerometers, IMU sensors, speedometer, etc.) to measure the vehicle's performance in response to the autonomous vehicle's processing of the simulated perception data 956. As an example, the vehicle test controller 950 may determine the vehicle's performance data such as acceleration/deceleration and velocity in response to the injection of the simulated perception data 956. The performance data may be analyzed in real-time by the test controller (e.g., measured against expected performance data for the scenario to determine whether the vehicle passed or failed the test scenario) and/or may be stored as test results data in the vehicle test database 955 for future analyses. Furthermore, the vehicle test controller 950 may further monitor and/or evaluate vehicle performance and behavior by receiving the path 926 generated by the planner 925 and the vehicle control commands 931 generated by the vehicle command generator 930. As an example, for evaluating vehicle performance for a particular test scenario testing the autonomous vehicle's braking performance in response to a virtual pedestrian simulated to cross the autonomous vehicle's path, the vehicle test controller 950 may determine an amount of time elapsed between a first time at which the simulated perception data 956 is injected (e.g., loading the simulated perception data 956 to the planner 925 to cause the planner 925 to process the simulated perception data 956) and a second time at which a brake command 933 in response to the processing of the simulated perception data 956 is observed. Still further, the path 926 may be received by the vehicle test controller 950 to determine whether the path 926 generated by the planner meets certain criterion of the test scenario (e.g., does not cross the path of any virtual objects, etc.). Still further, after the injection of the simulated perception data 956, the vehicle test controller 950 may continue to receive the vehicle localization data 916 (e.g., generated by the localization and pose estimation module 915 of the autonomous vehicle 900 based on sensor data 906 such as camera data, LiDAR data, and radar data) to determine and monitor a real-time location of autonomous vehicle within the RWVTS to determine the autonomous vehicle 900's performance and behavior in response to the simulated perception data 956. In an example, the vehicle test controller 950 may monitor the precise location of the vehicle (e.g., based on localization data 916 and/or data from inertial sensors, IMU sensors, accelerometers, etc.) to determine a deviation between the path 926 generated by the planner 925 in response to the simulated perception data 926 and the actual positions of the autonomous vehicle 900 over time during the test scenario.

According to embodiments, the virtual object(s) defined by the simulated perception data 956 may be reactive to the autonomous vehicle 900 and/or to other virtual objects. In one implementation, the test scenario data 956 may comprise programming code that may be executed by the vehicle test controller 950 to dynamically generate and/or update the simulated perception data 956 based on, for example, the movement, speed, path, etc. of the autonomous vehicle 900. In this manner, in addition to simulating the autonomous vehicle 900's perception of virtual objects that have a predetermined movement pattern or route, a test scenario may incorporate elements of interactivity and/or reactivity. In one aspect, a simulated trajectory of a virtual object defined by a set of simulated perception data may be updated dynamically based on the movement, speed, path, etc. of the autonomous vehicle 900. In this manner, an initial trajectory of a virtual object described by the simulated perception data may be updated to an updated trajectory of the virtual object. For instance, the virtual object may be programmed or configured to react, within certain limits, to attempt to maintain a certain distance from the autonomous vehicle 900 as the autonomous vehicle 900 reacts to the virtual object. In more detail, various aspects the reactivity of the virtual object (e.g., maximum acceleration/deceleration of the virtual object, how fast the virtual object reacts, etc.) may be dependent on a type or class of virtual object (e.g., a virtual pedestrian, a virtual vehicle, etc.) being simulated. Additionally, aspects of the reactivity and/or whether the virtual objects react to the autonomous vehicle 900 may also be programmed to be dependent on an orientation or pose of the virtual object relative to the autonomous vehicle. For instance, a virtual pedestrian may be programmed to not react to the movement of the autonomous vehicle 900 if the virtual pedestrian is oriented in a way such that a "field of view" of the virtual pedestrian does not include the autonomous vehicle 900.

According to embodiments, the vehicle test controller 950 may further receive information relating to other vehicles 971 such as location data and statuses (e.g., speed, test status, planned path, etc.) of one or more other vehicles under testing within the RWVTS. For instance, the vehicle test controller 950 may ascertain that no other vehicles are within a predetermined distance of the autonomous vehicle 900 before triggering a test scenario for the autonomous vehicle 900. The information 971 may be received from the other vehicles or from a central server that monitors the statuses of the vehicles under testing within the RWVTS.

Figure 10:
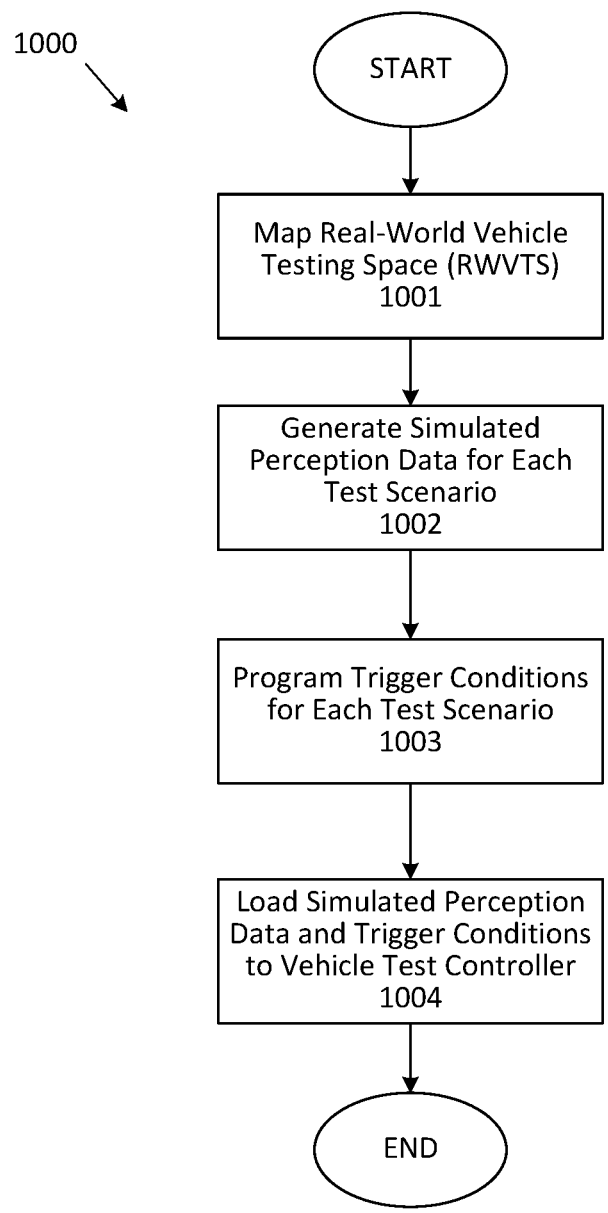
FIG. 10 is a flowchart diagram illustrating an example method of generating test scenarios for use within a real-world vehicle testing space (RWVTS), in accordance with embodiments.

FIG. 10 is a flowchart diagram illustrating an example method of generating test scenarios for use within a real-world vehicle testing space (RWVTS), in accordance with embodiments. The process 1000 depicted in FIG. 10 may be performed prior to an autonomous vehicle undergoing vehicle tests at the real-world vehicle testing space.

At step 1001, the RWVTS may be mapped. The RWVTS may refer to a physical space in which an autonomous vehicle undergoes vehicle-in-the-loop testing. Without limitation, the RWVTS may be a track, a loop, or may take on any other shape or form. The autonomous vehicle undergoing testing may navigate through the RWVTS to perform testing in accordance to one or more test scenarios. In particular, the one or more test scenarios may involve the use of simulated perception data injected to the autonomous vehicle's perception system to simulate conditions (e.g., presence of virtual or simulated objects, agents, etc.) that are different from the actual physical conditions of the environment surrounding the autonomous vehicle. For example, a test scenario may correspond to a simulated pedestrian cross the path of the autonomous vehicle while the vehicle travels at a high rate of speed.

According to embodiments, the real-world vehicle testing space may be mapped to generate detailed map data that describes the real-world vehicle testing space. The map data may provide a variety of information associated with the RWVTS (e.g., with reference to a coordinate system used to define position or location within the RWVTS). For example, the map data may provide information relating to identity and location of different travel ways, travel way segments, road boundaries, lane markers, curbs, bicycle lanes, turn lanes, environmental features or landmarks within the RWVTS, traffic control data (e.g., location and instructions of signage, traffic lights, or other traffic control devices within the RWVTS), and/or any other map data that provides information that assists the systems of the autonomous vehicle in comprehending and perceiving its place within the RWVTS.

At step 1002, simulated perception data for each test scenario is generated. The simulated perception data for a particular test scenario may describe or indicate one or more virtual object(s) to be simulated in the vehicle's perceived hybrid test environment during the test scenario. A virtual object is not one that is physically present in the real-world environment of the autonomous vehicle, but nevertheless perceived by the autonomous vehicle under testing. By processing the simulated perception data, the autonomous vehicle would behave as if the virtual object(s) simulated by the simulated perception data were actually in the physical environment of the autonomous vehicle. In other words, rather than describing real objects in the real-world environment of the autonomous vehicle, the simulated perception data describes virtual objects to which the autonomous vehicle under testing would react as if the virtual objects were real objects. The simulated perception data may describe one or more of: a classification of the simulated object being described by the simulated perception data (e.g., a vehicle, a pedestrian, a cyclist, a motorcyclist, etc.), an initial position of the simulated object (e.g., relative position to the autonomous vehicle under testing and/or position within the real-world testing space), a velocity and/or acceleration of the simulated object, a trajectory or path of the simulated object, an orientation or pose of the simulated object, a three-dimensional bounding shape (e.g., a bounding box) associated with the simulated object, etc. According to embodiments, the simulated perception data may describe a dynamic virtual object. In other words, the virtual object may be dynamically generated or updated to simulate a virtual object react to the behavior or movement of the autonomous vehicle or to other virtual objects.

At step 1003, trigger conditions for each test scenario may be programmed. A particular test scenario may be triggered based on the satisfaction of a set of trigger conditions programmed for the particular test scenario. For instance, in response to the satisfaction of the set of trigger conditions, the autonomous vehicle may be caused to process a set of simulated perception data (e.g., injected into the systems of the autonomous vehicle). The trigger conditions may include: a location within the RWVTS (e.g., test scenario to be triggered in response to the vehicle reaching a certain location within the RWVTS), a speed of the vehicle (e.g., test scenario to be triggered in response to the vehicle reaching a particular speed), time relative to an event or another trigger (e.g., test scenario to be triggered 10 seconds after a traffic light turns green or after the vehicle reaches a trigger location, a test scenario to be triggered based on an ETA of the autonomous vehicle to a particular location within the RWVTS, etc.), an operating condition of the vehicle (e.g., test scenario to be triggered after the vehicle reaches a certain speed, etc.), information relating to other vehicles under test (e.g., test scenario to be triggered after another vehicle is at least a certain distance away from the autonomous vehicle under test), and the like.

In one example, a particular location on the RWVTS may be designated as a pedestrian crosswalk. The particular location within the RWVTS may be physically marked within the RWVTS as a pedestrian crosswalk (e.g., using physical signage and/or painted road surface, etc.) and the map data of the RWVTS may similarly designate the particular location as a pedestrian crosswalk. Alternatively, the particular location within the RWVTS may not be marked physically, but may be simulated (e.g., based on the RWVTS map data and/or the simulated perception data) to be a pedestrian crosswalk. A set of simulated perception data corresponding to a virtual pedestrian crossing the crosswalk may be triggered to be injected (e.g., caused to be processed by the autonomous vehicle) based on the autonomous vehicle being three seconds away from the particular location (e.g., based on current velocity of the autonomous vehicle and/or based on the planned path for the vehicle including a planned acceleration or deceleration of the vehicle as part of the planned path).

At step 1004, the simulated perception data and the trigger conditions may be loaded to a vehicle test controller (e.g., vehicle test controller 950 of FIG. 9). For instance, the simulated perception data and the trigger conditions may be stored within a database (e.g., database 955 of FIG. 9) accessible to the vehicle test controller.

Figure 11:
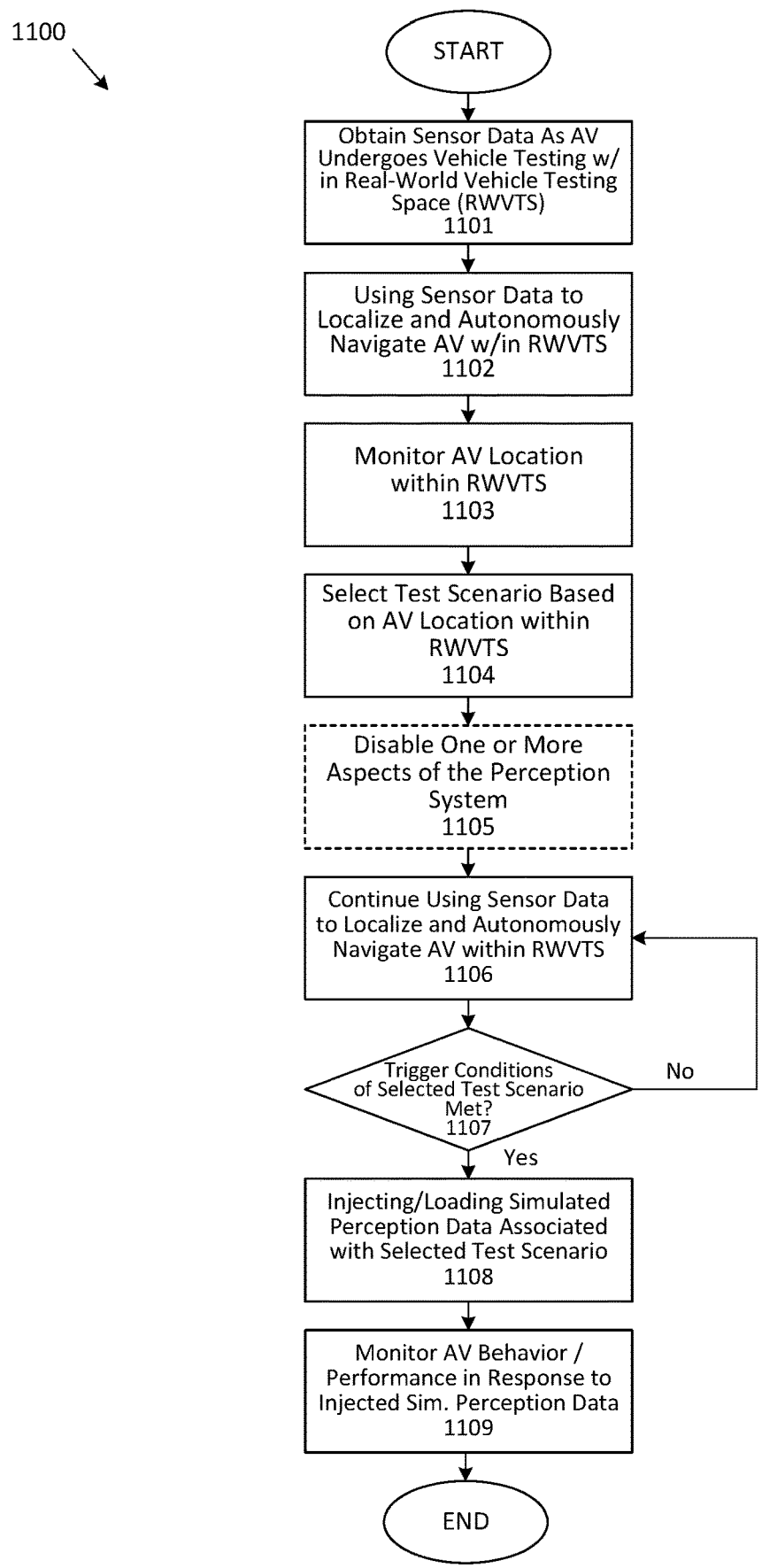
FIG. 11 is a flowchart diagram illustrating an example method of performing a vehicle test scenario within a real-world vehicle testing space (RWVTS) on an autonomous vehicle using simulated perception data, in accordance with embodiments.

FIG. 11 is a flowchart diagram illustrating an example method of performing a vehicle test scenario within a real-world vehicle testing space (RWVTS) on an autonomous vehicle using simulated perception data, in accordance with embodiments. As described herein, a vehicle-in-the-loop evaluation (e.g., a gauntlet of vehicle tests) may include a plurality of test scenarios and each of the test scenarios be a particular scenario for testing a particular set of functionalities of the autonomous vehicle. Each test scenario may be associated with a corresponding set of simulated perception data to be injected into the systems of the autonomous vehicle under testing to simulate one or more virtual objects or environmental features during the implementation of the test scenario. The vehicle test scenario may be performed based on an autonomous vehicle such as an autonomous truck, an autonomous delivery vehicle depicted in FIG. 2A, or an autonomous vehicle 900 depicted in FIG. 9.

At step 1101, the autonomous vehicle's sensors may generate sensor data as the autonomous vehicle undergoes vehicle testing within the RWVTS. Sensors of the autonomous vehicle may comprise, for example, cameras (e.g., long-range cameras, short-range cameras, thermal imaging cameras), LiDARs, radars, ultrasonic sensors, and the like. And at step 1102, the autonomous vehicle may use the sensor data to localize itself within the RWVTS and autonomously navigate the RWVTS using the sensor data. For instance, a localization and pose estimation module of the autonomous vehicle may execute a localization algorithm to use the sensor data and detailed map data of the RWVTS to precisely determine a current location of the autonomous vehicle within the RWVTS. Furthermore, a planner of the autonomous vehicle may use the localization data and the detailed map data of the RWVTS to navigate the autonomous vehicle along a route to traverse the RWVTS (e.g., to go around a vehicle test track).

At step 1103, the autonomous vehicle location within the RWVTS may be monitored in real time based on the localization data generated by the autonomous vehicle. In one embodiment, the localization data may be conveyed to a vehicle test controller which may, in real time, monitor and track the autonomous vehicle location within the RWVTS. In addition to the autonomous vehicle location within the RWVTS, the vehicle test controller may monitor various aspects of the vehicle test and vehicle operating parameters of the autonomous vehicle under testing and/or to other autonomous vehicles under testing within the real-world vehicle testing space. Based on such information, the vehicle test controller may control the injection of simulated perception data to the perception system of the autonomous vehicle to initiate a test scenario and/or operation of the autonomous vehicle (e.g., disable one or more aspects of the perception system of the autonomous vehicle such as generating perception data using sensor data, modifying speed of the autonomous vehicle, stop the autonomous vehicle, etc.). According to embodiments, the vehicle test controller may be embodied by software executing on a computational system (e.g., a main compute) of the autonomous vehicle under testing. As an alternative, or in addition, the vehicle test controller may be implemented on a computing device (e.g., a laptop computer, a tablet computer, etc.) co-located with the autonomous vehicle and communicatively coupled to the systems of the autonomous vehicle. As yet another alternative, or in addition, the vehicle test controller may be implemented by a computing device (e.g., a server computer) that is remotely located from the autonomous vehicle and communicates with the autonomous vehicle via a wireless communication link (e.g., a cellular data network, a Wi-Fi network, etc.).

At step 1104, the vehicle test controller may select or identify the next test scenario to be performed in evaluating the autonomous vehicle. In some embodiments, the identification of the next test scenario may be performed based on the autonomous vehicle location within the RWVTS. At step 1105, the vehicle test controller may cause the autonomous vehicle to disable one or more aspects of the perception module or system. For instance, the perception module of the autonomous vehicle may be prevented from generating real perception data using sensor data generated by the sensors of the autonomous vehicle. In effect, the perception module of the autonomous vehicle may be prevented from perceive the surrounding environment of the autonomous vehicle either during the entirety of the vehicle test or at specific instances or times of the vehicle test. The perception module of the autonomous vehicle may be prevented from receiving sensor data or the perception module may be turned off or prevented from processing the sensor data.

According to embodiments, the perception system may be programmatically caused to cease generating real perception data using sensor data. For example, the test instructions for a particular test scenario of the vehicle test may include an instruction to cause the perception system of the autonomous vehicle to cease generating real perception data. Depending on the implementation, the disabling of one or more aspects of the perception system or module may be selectively performed based on the next test scenario to be performed. For example, some test scenarios may test the vehicle using a combination of real-world obstacles and objects on the RWVTS and injected simulated perception data. For these test scenarios, the perception module may continue operating to generate real perception data.

At step 1106, while the one or more aspects of the perception system or module is disable, the autonomous vehicle may continue to use sensor data (e.g., camera data and LiDAR data) to localize and autonomously navigate the autonomous vehicle within the real-world vehicle testing space. More specifically, while the perception system may be caused to cease generating perception data using sensor data, a localization system of the autonomous vehicle may continue to use sensor data such as camera and LiDAR data generated by the autonomous vehicle's sensors to localize the autonomous vehicle within the real-world vehicle testing space and enable the autonomous vehicle to autonomously navigate the real-world vehicle testing space (e.g., autonomously proceed along a test loop or test course).

At step 1107, the vehicle test controller may determine whether a set of trigger conditions associated with a particular test scenario is met. The set of trigger conditions may comprise, for example, one or more of: a real-time location of the autonomous vehicle within the real-world vehicle testing space, real-time operating conditions of the autonomous vehicle, one or more timing constraints, status of other vehicles within the real-world vehicle testing space (e.g., operating conditions, location, test statuses, etc.).

At step 1108, in response to a determination that the set of trigger conditions associated with the particular test scenario is met, simulated perception data associated with the particular test scenario is injected the systems of the autonomous vehicle (e.g., loaded or conveyed to the planner of the autonomous vehicle). At step 1109, the vehicle test controller may monitor the behavior and/or performance of the autonomous vehicle in response to the injection of the simulated perception data. This may be done to evaluate the autonomous vehicle performance in response to the injected simulated perception data as well as to monitor the progress of the test scenario and/or determine whether the test scenario has been completed.

Figure 12:
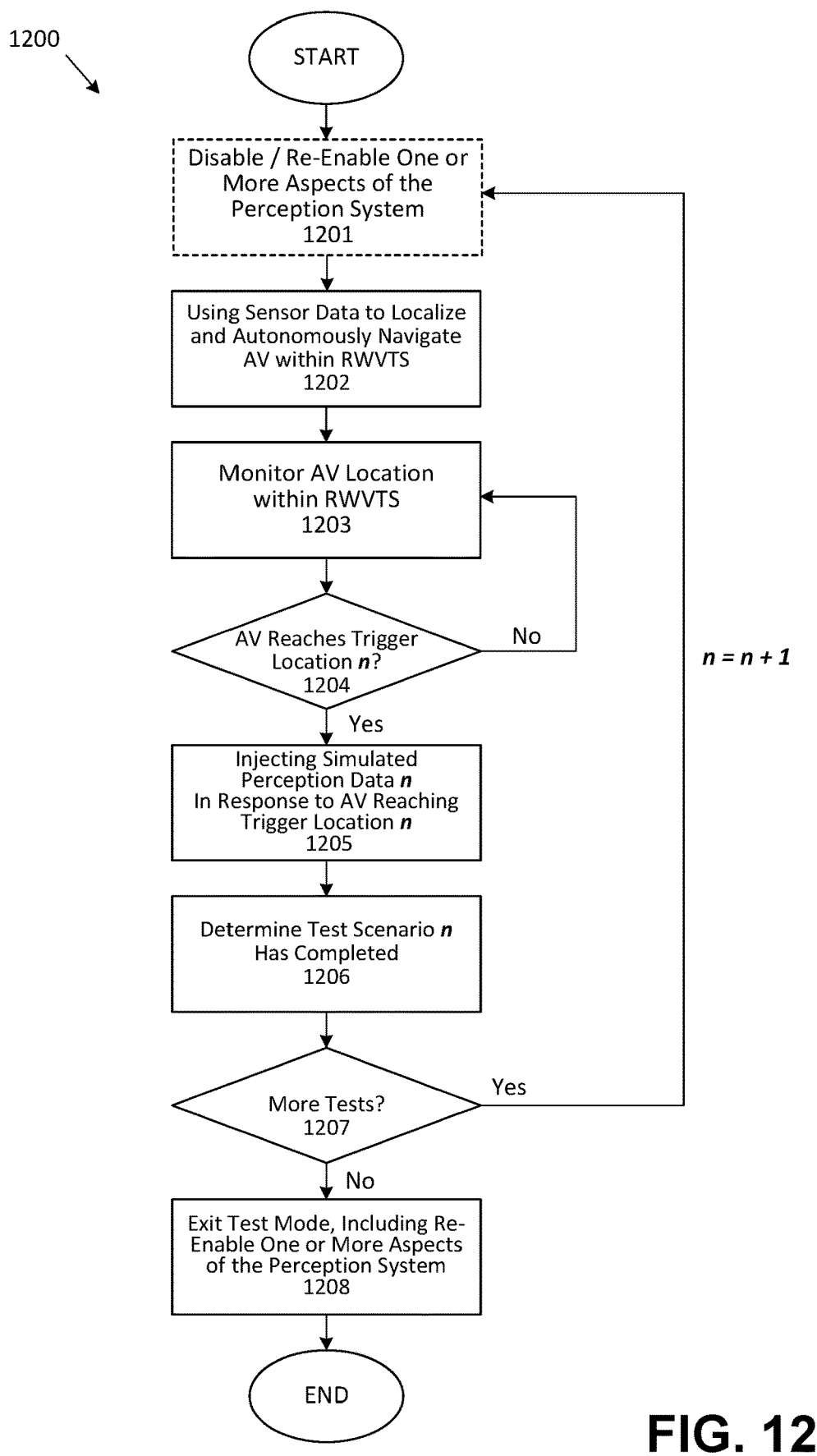
FIG. 12 is a flowchart diagram illustrating an example method of performing multiple test scenarios for a vehicle evaluation within a real-world vehicle testing space (RWVTS), in accordance with embodiments.

FIG. 12 is a flowchart diagram illustrating an example method of performing multiple test scenarios for a vehicle evaluation within a real-world vehicle testing space (RWVTS), in accordance with embodiments.

At step 1201, a vehicle test controller may enable or disable one or more aspects of a perception system or module of the autonomous vehicle in advance of performing a test scenario. This may be selectively performed based on the particular test scenario (e.g., based on whether the test scenario uses only simulated perception data, a combination of simulated perception data and real-world obstacles or objects placed within the RWVTS, or only real-world obstacles or objects placed within the RWVTS). At step 1202, the autonomous vehicle uses sensor data to localize and navigate the autonomous vehicle within the RWVTS. This may be performed while the one or more aspects of the perception system or module of the autonomous vehicle is disabled. At step 1203, a vehicle test controller monitors the autonomous vehicle's precise location within the RWVTS to, for example, determine whether to trigger a test scenario to be implemented.

At steps 1204 and 1205, in response to the autonomous vehicle reaching a particular trigger location within the RWVTS, the vehicle test controller may inject a corresponding set of simulated perception data to initiate a particular test scenario. As described herein, the vehicle-in-the-loop evaluation may comprise a plurality of test scenarios which may be performed sequentially and automatically or autonomously. The vehicle test controller may monitor the autonomous vehicle location within the RWVTS to automatically trigger the performance of test scenarios as the autonomous vehicle progresses through the RWVTS. For example, the autonomous vehicle may progress through a vehicle test track and upon the autonomous vehicle arriving at a first trigger location within the RWVTS, the vehicle test controller may automatically trigger the inject of a first set of simulated perception data associated with the first test scenario. The autonomous vehicle may complete the first test scenario and continue to progress through a vehicle test track and upon reaching a second trigger location within the RWVTS, the vehicle test controller may automatically trigger the injection of a second set of simulated perception data associated with the second test scenario.

At step 1206, the vehicle test controller may monitor vehicle data to determine that the test scenario has been completed. If no additional tests are to be performed, the autonomous vehicle may be caused to exit testing mode and the one or more aspects of the perception system that were disabled in step 1201 may be re-enabled. Otherwise, the autonomous vehicle may continue to progress through the RWVTS and the next test scenario may be performed.

Although only a few embodiments have been described in this disclosure, it should be understood that the disclosure may be embodied in many other specific forms without departing from the spirit or the scope of the present disclosure. By way of example, methods described above are not limited to being applied to estimate assurance. Methods may additionally, or alternatively, be implemented in an accelerated life testing process. A component of automotive hardware may be put through a test schedule that is designed to be substantially equivalent to the total force, vibration, shock, heat, cold, salt spray, etc. observed over the component's entire life cycle. A component may be tested for durability in a relatively short period of time using methods described above, or methods similar to those described above.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method of testing autonomous vehicles, the method comprising:
   generating, by a set of sensors of an autonomous vehicle, sensor data;
   causing one or more aspects of a perception system of the autonomous vehicle to be disabled such that the perception system ceases to generate real-world perception data based on the sensor data;
   while the one or more aspects of the perception system are disabled, determining a location of the autonomous vehicle within a real-world vehicle testing space based on the sensor data and autonomously navigating the autonomous vehicle through the real-world vehicle testing space;
   in response to determining that a first set of trigger conditions associated with a first test scenario is satisfied, causing a first set of simulated perception data to be processed by the autonomous vehicle, the first set of simulated perception data being associated with the first test scenario; and
   evaluating performance of the autonomous vehicle in response to the processing of the first set of simulated perception data.

2. The method of claim 1, wherein the sensor data comprises data generated by one or more of: a camera, a thermal imaging sensor, a LiDAR sensor, or a radar sensor.

3. The method of claim 1, wherein determining the location of the autonomous vehicle within the real-world vehicle testing space is based further on a set of map data of the real-world vehicle testing space.

4. The method of claim 3, wherein the set of map data describes a road boundary and a lane marker within the real-world vehicle testing space.

5. The method of claim 1, wherein the first set of simulated perception data describes a virtual object, a classification of the virtual object, a position of the virtual object, a trajectory of the virtual object, an orientation of the virtual object, and a three-dimensional bounding shape of the virtual object.

6. The method of claim 1, wherein the first set of trigger conditions associated with the first test scenario comprises one or more of: a location within the real-world vehicle testing space, a vehicle speed condition, or a temporal condition.

7. The method of claim 1, wherein the first set of trigger conditions associated with the first test scenario comprises an estimated time of arrival of the autonomous vehicle at a location within the real-world vehicle testing space.

8. The method of claim 1, further comprising:
   generating updated simulated perception data based on the performance of the autonomous vehicle in response to the processing of the first set of simulated perception data;
   wherein the first set of simulated perception data describes a virtual object and an initial trajectory of the virtual object; and
   wherein the updated simulated perception data describes an updated trajectory of the virtual object.

9. The method of claim 8, wherein generating the updated simulated perception data is based further on a type or classification of the virtual object.

10. The method of claim 1, further comprising:
    after completion of the first test scenario, continuing to autonomously navigate the autonomous vehicle through the real-world vehicle testing space; and
    in response to determining that a second set of trigger conditions associated with a second test scenario is satisfied, causing a second set of simulated perception data to be processed by the autonomous vehicle, the second set of simulated perception data being associated with the second test scenario.

11. The method of claim 10, wherein the first set of trigger conditions associated with the first test scenario comprises a first location within the real-world vehicle testing space and the second set of trigger conditions associated with the second test scenario comprises a second location within the real-world vehicle testing space.

12. The method of claim 10, further comprising causing the one or more disabled aspects of a perception system of the autonomous vehicle to be re-enabled prior to performing the second test scenario.

13. The method of claim 12, wherein performing the second test scenario comprises using a combination of the real-world perception data generated by the perception system of the autonomous vehicle based on the sensor data and the second set of simulated perception data.

14. The method of claim 1, further comprising, after completion of the first test scenario, causing the one or more disabled aspects of a perception system of the autonomous vehicle to be re-enabled.

15. The method of claim 1, further comprising:
generating the set of map data describing the real-world vehicle testing space;
generating, for each of a plurality of test scenarios, a corresponding set of simulated perception data, the plurality of test scenarios including the first test scenario; and
determining, for each of the plurality of test scenarios, a corresponding set of one or more trigger conditions.

16. The method of claim 1, wherein evaluating the performance of the autonomous vehicle in response to the processing of the first set of simulated perception data comprises using the sensor data generated by the set of sensors of the autonomous vehicle to evaluate the performance of the autonomous vehicle in response to the processing of the first set of simulated perception data.

17. An autonomous vehicle comprising:
a set of sensors for generating sensor data;
a perception system configured to generate real-world perception data based on the sensor data, the real-world perception data being representative of one or more real-world objects in an environment of the autonomous vehicle perceived by the perception system based on the sensor data;
wherein the autonomous vehicle is configured to:
disable one or more aspects of the perception system such that the perception system ceases to generate real-world perception data based on the sensor data;
while the one or more aspects of the perception system are disabled, determine the location of the autonomous vehicle within a real-world vehicle testing space based on the sensor data and autonomously navigate through the real-world vehicle testing space;
process a first set of simulated perception data associated with a test scenario, the set of simulated perception data being processed in response to satisfaction of one or more trigger conditions associated with the test scenario; and
autonomously maneuver in response to processing the set of simulated perception data.

18. The autonomous vehicle of claim 17, wherein the sensor data comprises data generated by one or more of: a camera, a thermal imaging sensor, a LiDAR sensor, or a radar sensor.

19. The autonomous vehicle of claim 17, wherein the set of simulated perception data describes a virtual object, a classification of the virtual object, a position of the virtual object, a velocity of the virtual object, an orientation of the virtual object, and a three-dimensional bounding shape of the virtual object.

20. The autonomous vehicle of claim 17, wherein the set of one or more trigger conditions associated with the test scenario comprises one or more of: a location within the real-world vehicle testing space, a vehicle speed condition, or a temporal condition.

* * * * *